(No Model.)

G. E. WHEELER.
CAR BRAKE.

No. 553,442. Patented Jan. 21, 1896.

WITNESSES:
Paul Jobst
J. Fred Acker

INVENTOR
G. E. Wheeler
BY
Munn & Co
ATTORNEYS.

UNITED STATES PATENT OFFICE.

GEORGE EDGAR WHEELER, OF MINNEAPOLIS, MINNESOTA.

CAR-BRAKE.

SPECIFICATION forming part of Letters Patent No. 553,442, dated January 21, 1896.

Application filed July 15, 1895. Serial No. 556,078. (No model.)

*To all whom it may concern:*

Be it known that I, GEORGE EDGAR WHEELER, of Minneapolis, in the county of Hennepin and State of Minnesota, have invented a new and Improved Brake, of which the following is a full, clear, and exact description.

My invention relates to an improvement in car-brakes, and especially to a brake adapted for use on street-cars; and the object of the invention is to provide a brake which may be made to act quickly and which will require but little effort on the part of the motorman, gripman or driver to bring said brake into action; and a further object of the invention is to so construct the brake that it will not interfere with the regular brake, which latter may be left undisturbed and used in an emergency, should anything happen to the improved brake device.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
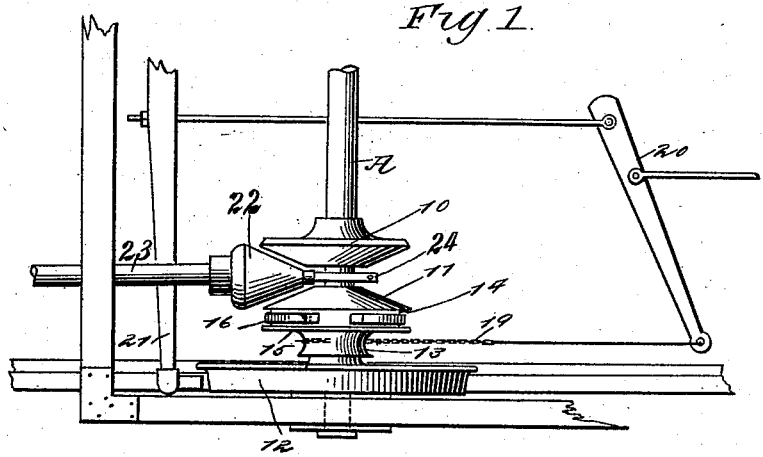
Figure 2:
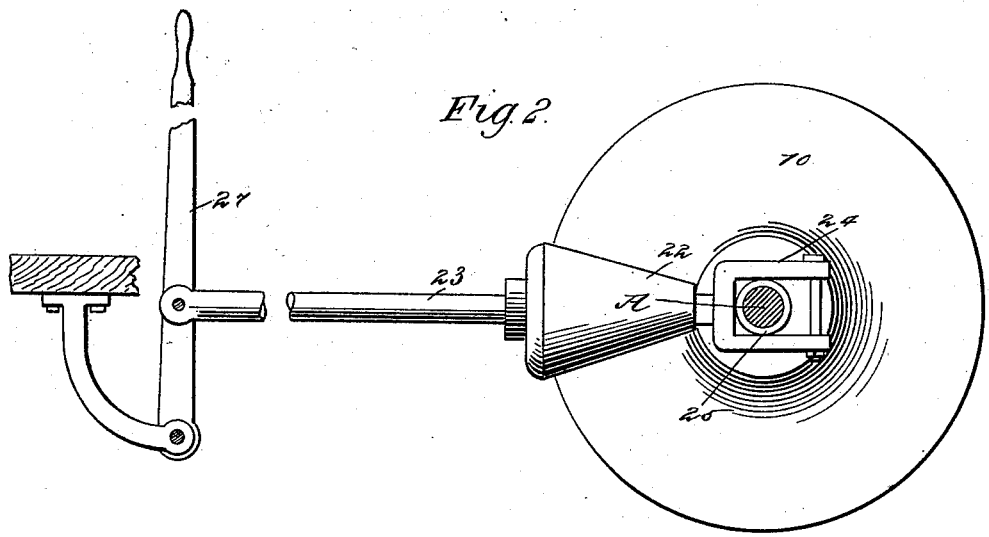
Figures 3, 4:
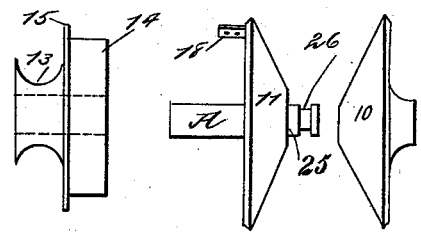
Figure 5:
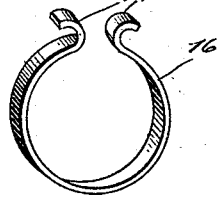

Figure 1 is a plan view of the improved brake. Fig. 2 is a section taken through the axle and through the central portion of the brake. Fig. 3 is a side elevation of the drum-section of the brake. Fig. 4 is a side elevation of the two friction-wheels adapted to control the brake, and Fig. 5 is a perspective view or the spring-shoe adapted for the control of the drum.

In carrying out the invention a beveled friction-wheel 10 is secured upon an axle A of the car, whereby the axle and friction-wheel will turn together. Opposite and facing the beveled surface of the friction-wheel 10 a second friction-wheel 11 is loosely mounted on the axle, being preferably located between the fixed wheel and the track-wheel 12 of the axle. Adjacent to the straight or outer face of the loosely-mounted friction-wheel 11 a drum 13 is loosely mounted on the axle, having secured to its inner face a band-wheel 14 of greater diameter than the drum, the said band-wheel being separated from the drum by a flange 15. This band-wheel is adapted for contact with the outer face of the loosely-mounted beveled wheel 11, and when the band and beveled wheels are brought together the margin or rim of the friction-wheel will constitute a flange opposed to the flange 15 on the band-wheel, forming a second flange for this wheel, and around the band-wheel a spring brake-strap 16 is passed, and is held in frictional contact therewith to a greater or less extent. The said spring-strap is normally of circular shape, but is divided to form two terminals 17, and these terminals are flared or curved in opposite directions, being carried over the body of the strap. One end of the spring-strap is secured to a lug 18, projecting outwardly from the outer face of the loosely-mounted friction-wheel 11, being secured to the lug through the medium of set-screws. The opposite end of the strap is preferably free, and according to the adjustment of the set-screws the strap will be made to bind more or less firmly and be more or less in frictional engagement with the band-wheel.

A brake-chain 19 is secured to the drum 13, being adapted to be wound thereon, and the said chain is connected either directly or indirectly with a brake-lever 20, connected with any form of brake 21 to set the same.

A conical friction-wheel 22 is adapted for engagement with both of the beveled friction-wheels 10 and 11, but is normally held out of engagement with both. The conical wheel 22 is mounted to revolve on a shaft 23, and this shaft is provided with a yoke 24 at its inner end, which passes over the axle between the friction-wheels 10 and 11 and in engagement with a friction-roller 25 on the said axle, the latter being provided with a suitable groove 26, (shown in Fig. 4,) to receive the yoke; and the outer end of the shaft 23 is connected with a lever 27, usually a hand-lever, this lever being made to extend upward preferably through the platform of the car.

The operation of the brake is as follows: By the movement of the lever on the platform the cone friction-wheel 22 is forced in contact with the beveled friction-wheels 10 and 11. The friction-wheel 10 being keyed fast on the axle communicates motion to the cone-wheel 22, which in turn causes the beveled friction-wheel 11 to revolve, carrying the drum 13 with it. Therefore the brake-chain, which is connected in the usual manner with the brake-lever, is wound on the drum and the brake will thus be set. The revolution of the drum 13 will continue until the pressure exerted by the spring-shoe 16 is overcome, whereupon the friction-wheel will stop and hold the brake with a force equal to that required to overcome the friction of the drum on the said spring-shoe. The tension of the said spring-shoe, as heretofore stated, is regulated by set-screws and can be set as tight as required, the object being to set it sufficiently tight to apply the brake strongly, but not so strongly as to block the car-wheels and cause them to slide. This spring-shoe also permits the friction-wheels to continue to revolve while in contact, preventing unequal wear of the said wheels, which would not be the case were the spring-shoe not used and the friction-wheel 11 were made in one piece with the drum 13.

Having thus described my invention, I claim as new and desire to secure by Letters Patent—

1. In a car brake, the combination, with the axle, a friction wheel secured thereon, and a second friction wheel having a beveled face loosely mounted on the axle and opposed to the fixed wheel, of a conical friction wheel having movement to and from the beveled wheels and adapted for engagement with both, and a drum actuated from the loosely mounted friction wheels and adapted to operate the brake of the car, as and for the purpose specified.

2. In a car brake, the combination, with the car axle, a beveled friction wheel secured thereon, a second beveled friction wheel loosely mounted on the axle, facing the fixed wheel, and a conical friction wheel having movement to and from the beveled wheels and adapted for engagement with both, of a drum actuated from the loosely mounted beveled wheel and connected with the brakes, and a spring shoe having frictional engagement with a portion of the drum, being attached to the adjoining friction wheel, as and for the purpose specified.

3. In a car brake, the combination, with the car axle, a beveled friction wheel secured thereon, a second beveled friction wheel loosely mounted on the axle, facing the fixed wheel, and a conical friction wheel having movement to and from the beveled wheels and adapted for engagement with both, of a drum actuated from the loosely mounted beveled wheel and connected with the brakes, a spring shoe having frictional engagement with a portion of the drum, being attached to the adjoining friction wheel, and means, substantially as described, for adjustably attaching the spring shoe to the friction wheel and for actuating the conical friction wheel, as and for the purpose specified.

4. In a car brake, a friction wheel having a beveled face and actuated by the axle of a car, a second friction wheel of like character loosely mounted, a conical transmitting wheel adapted for contact with the beveled faces of both of the beveled wheels, and a drum adapted for connection with the brakes, having a tensional engagement with the loosely mounted beveled wheel, and actuated thereby, as and for the purpose specified.

GEORGE EDGAR WHEELER.

Witnesses:
  A. D. POLK,
  J. W. LAUDERDALE.